US010920743B2

(12) United States Patent
Danielsen (10) Patent No.: US 10,920,743 B2
(45) Date of Patent: Feb. 16, 2021

(54) MISALIGNED SPAR CAP SCARF JOINT CONNECTION

(71) Applicant: General Electric Company, Schenectady, NY (US)

(72) Inventor: Darren John Danielsen, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 156 days.

(21) Appl. No.: 15/679,204

(22) Filed: Aug. 17, 2017

(65) Prior Publication Data

US 2019/0055921 A1 Feb. 21, 2019

(51) Int. Cl.
*F03D 1/06* (2006.01)
*B29C 65/70* (2006.01)
*B29C 65/00* (2006.01)
*B29L 31/08* (2006.01)

(52) U.S. Cl.
CPC ............ *F03D 1/0675* (2013.01); *B29C 65/70* (2013.01); *B29C 66/12261* (2013.01); *B29C 66/721* (2013.01); *B29L 2031/085* (2013.01); *F05B 2220/706* (2013.01); *F05B 2240/2211* (2013.01); *F05B 2240/302* (2013.01); *F05B 2280/6003* (2013.01)

(58) Field of Classification Search
CPC ............ B29L 2031/085; F03D 1/0675; F05B 2220/706; F05B 2240/2211; F05B 2240/302; F05B 2280/6003
See application file for complete search history.

(56) References Cited

U.S. PATENT DOCUMENTS

| 7,273,984 B2 | 9/2007 | Murphy |
| 7,841,835 B2 | 11/2010 | Bagepalli et al. |
| 7,891,950 B2 | 2/2011 | Baker et al. |

(Continued)

FOREIGN PATENT DOCUMENTS

| EP | 3098440 A1 | 11/2016 |
| WO | WO 2014/053631 A1 | 4/2014 |

(Continued)

OTHER PUBLICATIONS

International Search Report, dated Dec. 4, 2018 for PCT Application No. PCT/US2018/045942.

*Primary Examiner* — Lindsay M Low
*Assistant Examiner* — Ruben Picon-Feliciano
(74) *Attorney, Agent, or Firm* — Dority & Manning, P.A.

(57) ABSTRACT

Structures and methods for joining misaligned or dissimilar width spar caps are disclosed as having a connecting structure in a rotor blade assembly for a wind turbine, wherein a first blade segment defines a first joint end, the first blade segment having at least one spar cap. A second blade segment defines a forward end coupled to the first blade segment, the second blade segment having at least one spar cap offset from the spar cap of the adjoining first blade segment. At least one connecting structure is coupled between the adjoining spar caps of the first blade segment and the second blade segment, the connecting structure having a plurality of sequentially stacked plies configured for parallel fiber alignment with the adjoining spar caps and cross-sectional area continuity with the adjoining spar caps.

10 Claims, 11 Drawing Sheets

(56) References Cited

U.S. PATENT DOCUMENTS

| | | |
|---|---|---|
| 7,976,282 B2 | 7/2011 | Livingston et al. |
| 8,070,451 B2 | 12/2011 | Peace et al. |
| 8,177,514 B2 | 5/2012 | Hibbard |
| 8,764,401 B2 | 7/2014 | Hayden et al. |
| 8,777,578 B2 | 7/2014 | Hancock et al. |
| 9,099,857 B2 | 8/2015 | Simonsohn |
| 9,297,357 B2 | 3/2016 | Busbey et al. |
| 2011/0091326 A1 | 4/2011 | Hancock |
| 2014/0271217 A1 | 9/2014 | Baker |
| 2015/0064014 A1* | 3/2015 | Bakhuis ............... F03D 1/0675 416/229 R |
| 2016/0281680 A1 | 9/2016 | Randall |
| 2016/0341177 A1 | 11/2016 | Bech et al. |

FOREIGN PATENT DOCUMENTS

| | | |
|---|---|---|
| WO | WO2016087594 A1 | 6/2016 |
| WO | WO 2017/108692 A1 | 6/2017 |

\* cited by examiner

MISALIGNED SPAR CAP SCARF JOINT CONNECTION

FIELD OF THE INVENTION

The present subject matter relates generally to wind turbines and, more particularly, to methods and assemblies for joining misaligned spar caps in rotor blade assemblies using connecting structures having specifically stacked plies.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally known, the deflection of a rotor blade is a function of blade length, along with wind speed, turbine operating states and blade stiffness. Thus, longer rotor blades may be subject to increased forces, particularly when a wind turbine is operating in high-speed wind conditions. These increased deflection forces not only produce fatigue on the rotor blades and other wind turbine components but may also increase the risk of the rotor blades striking the tower.

In the construction of a typical rotor blade, a spar cap provides increased rotor blade strength by integrating one or more structural elements running along the length of the rotor blade on both interior sides of the rotor blade. Shear webs are like a cross-beam or i-beam running essentially perpendicular to the top and bottom spar caps and extending across the interior portion of the rotor blade between the outer skins. Spar caps have typically been constructed from glass fiber reinforced composites, though some larger blades are beginning to use spar caps constructed from carbon fiber reinforced composites and fiber reinforced plastics.

Such rotor blades, however, are not without issues. One particular issue that has arisen involves joining misaligned spar caps in rotor blade segments, inserts and other rotor blade joints.

BRIEF DESCRIPTION OF THE INVENTION

Aspects and advantages of the invention will be set forth in part in the following description, or may be obvious from the description, or may be learned through practice of the invention.

In one aspect, the present subject matter is directed to misaligned spar caps having a connecting structure in a rotor blade assembly for a wind turbine wherein a first blade segment defines a first joint end, the first blade segment having at least one spar cap. Also a second blade segment defines a forward end coupled to the first blade segment, the second blade segment having at least one spar cap offset from the spar cap of the adjoining first blade segment. And, at least one connecting structure is coupled between the adjoining spar caps of the first blade segment and the second blade segment, the connecting structure having a plurality of sequentially stacked plies configured for parallel fiber alignment with the adjoining spar caps and cross-sectional area continuity with the adjoining spar caps.

In another aspect, the present subject matter is directed to dissimilar width spar cap connections as described above, with at least one small-width spar cap offset on both chordwise edges from a larger-width spar cap of the adjoining first blade segment.

In a further aspect, the present subject matter is directed a method for assembling a connecting structure having a first blade segment with at least one spar cap and a second blade segment with at least one spar cap misaligned, and/or of dissimilar width, with the first blade segment spar cap, the method having the steps of positioning a forward end of a second blade segment adjacent to a first joint end of a first blade segment, the forward end and joint end having at least one scarfed section and at least one spar cap offset caused by misalignment or dissimilar width of the at least one spar cap. Then constructing at least one contoured adjacent structure adjacent the at least one scarfed section. Then stacking a plurality of plies in the at least one scarfed section to conform against the at least one contoured adjacent structure, the plurality of stacked plies configured for parallel fiber alignment with adjoining misaligned spar caps and cross-sectional area continuity with the adjoining misaligned spar caps. And then applying resin to the plurality of stacked plies and the adjoining misaligned spar caps to form the connecting structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to misaligned and dissimilar width spar caps of blade segments configured to be secured together in a wind turbine rotor blade, including modular blades. In several embodiments, a blade segment may be installed between other blade segments as a one-piece construction (as opposed to installing the blade segment in two or more pieces, such as by installing separate shell halves of the second blade segment between other blade segments). Thus, as will be described below, the second blade segment may be configured such that certain access features (e.g., access windows) are defined between the first and second blade segments to permit the ends of the blade segments to be secured to the joint end of each blade segment. In addition, various assembly components (e.g., scarfed connectors, shell inserts, window covers, etc.) may be installed between the second blade segment and other blade segments to facilitate coupling such components to one another.

For blade extension joints and modular blade joints, the spar cap at the joint may be misaligned and/or have dissimilar width. The methods and assemblies herein allow a structurally sound connecting structures to be used at the scarfed section in the spar cap joint despite this misalignment and or width variance. The methods and assemblies ensure that the joint has adequate strength and the fiber direction remains aligned. The blade assemblies disclosed herein can use a plurality of predefined geometrically shaped plies, such as polygons or irregular hexagons, possibly in a sequenced installation kit, to assemble the scarf joint and ensure the fibers remain aligned while minimizing impact to the cross sectional area. The connection method chamfers, tapers or "feathers" all of the layers to the appropriate scarf-angle distance from the edge of the joint. This exposes each axial element within the spar cap laminate to a suitable overlap distance (chord-wise and span-wise). This method ensures each independent fiber layer regains its original axial-load direction within the layup while maintaining cross-sectional area through the connecting structure.

Figure 1:
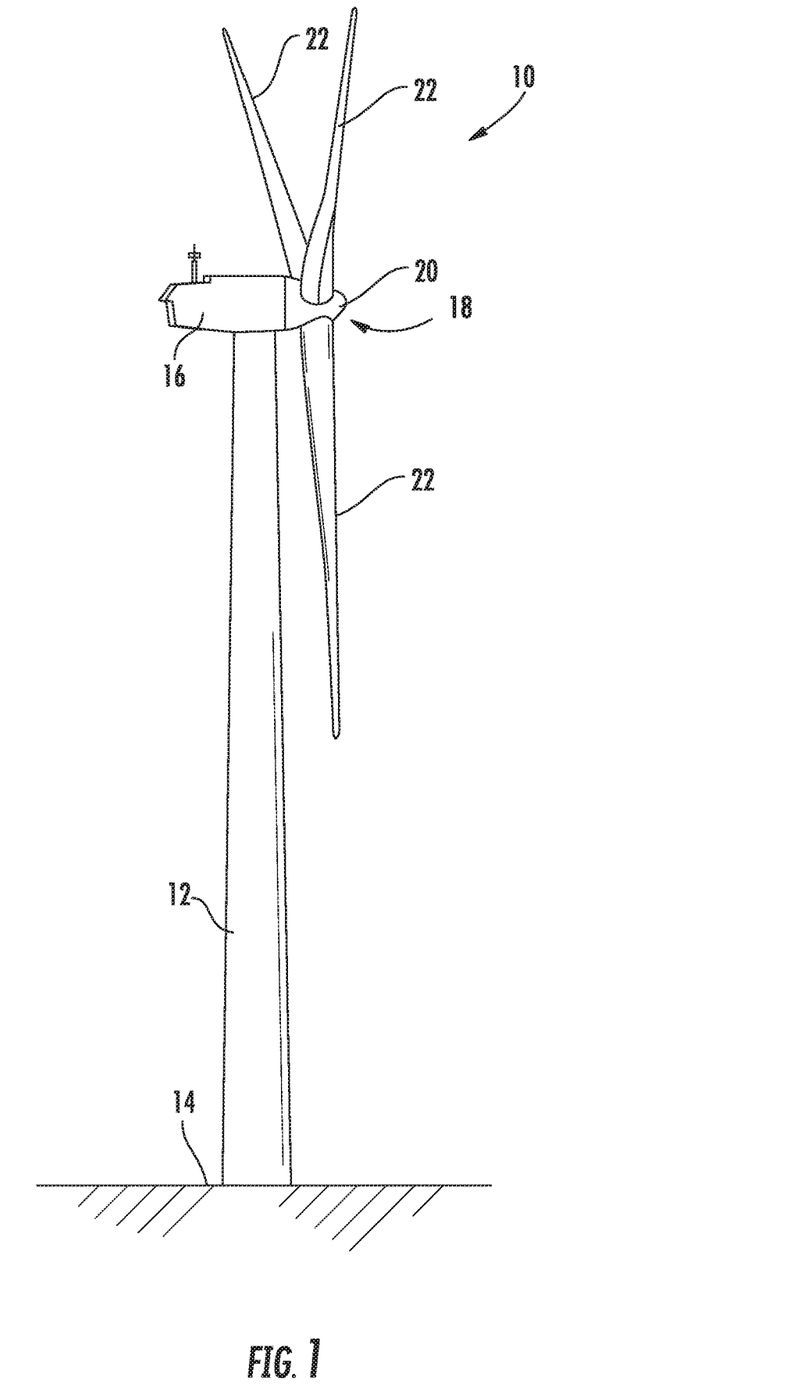
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
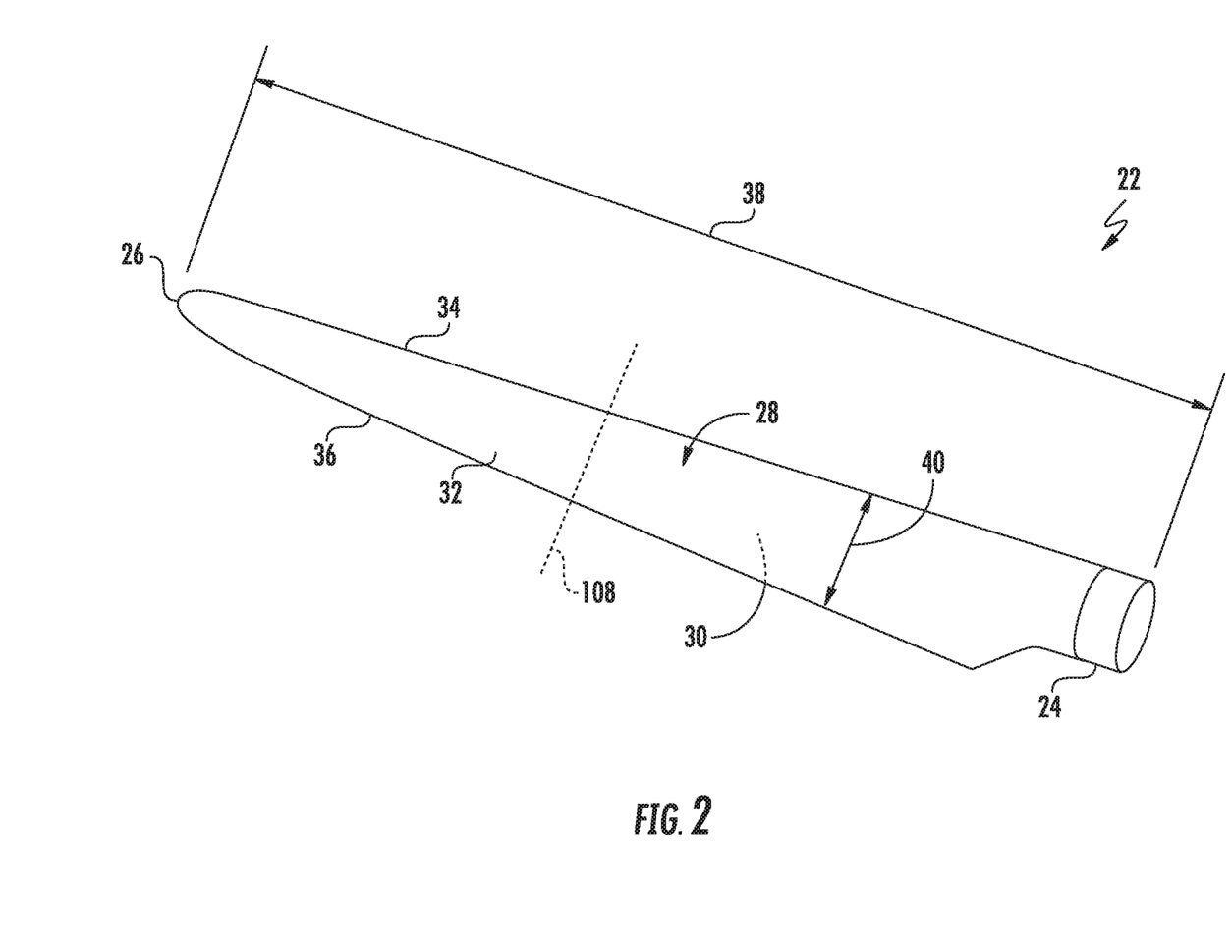
FIG. 2 illustrates a perspective view of one embodiment of one of the rotor blades of the wind turbine shown in FIG. 1.

Referring now to FIG. 2, a perspective view of one of the rotor blades 22 shown in FIG. 1 is illustrated. As shown, the rotor blade 22 generally includes a blade root 24 configured for mounting the rotor blade 22 to the hub 20 of the wind turbine 10 (FIG. 1) and a blade tip 26 disposed opposite the blade root 24. A body 28 of the rotor blade 22 may generally be configured to extend between the blade root 24 and the blade tip 26 and may serve as the outer casing/skin of the blade 22. In several embodiments, the body 28 may define a substantially aerodynamic profile, such as by defining a symmetrical or cambered airfoil-shaped cross-section. As such, the body 28 may include a pressure side 30 and a suction side 32 extending between a leading edge 34 and a trailing edge 36. Further, the rotor blade 22 may have a span 38 defining the total length between the blade root 22 and the blade tip 24 and a chord 40 defining the total length between the leading edge 34 and the trialing edge 36. As is generally understood, the chord 40 may vary in length with respect to the span 38 as the rotor blade 22 extends from the blade root 22 to the blade tip 24.

Figure 4:
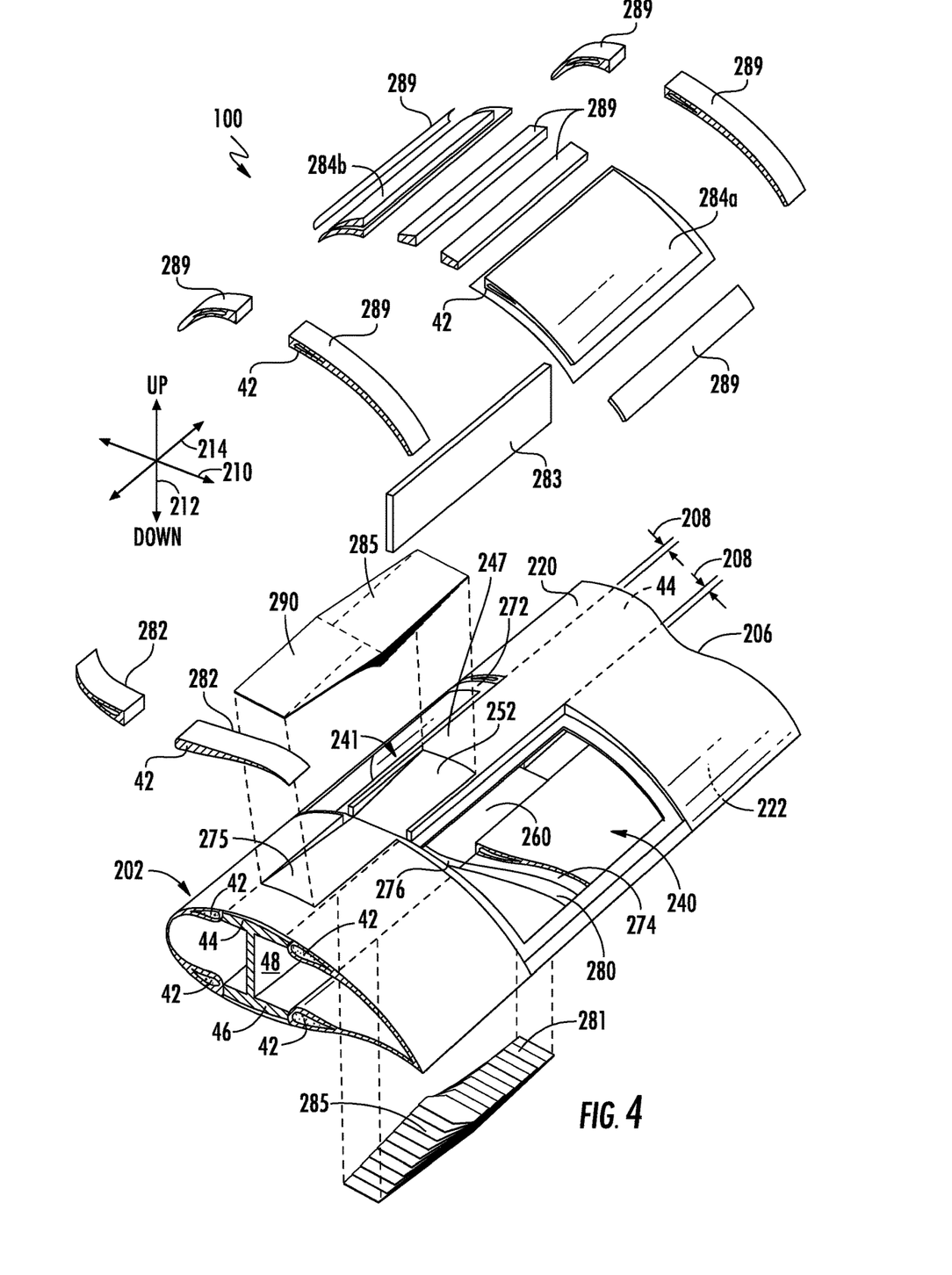
FIG. 4 illustrates a perspective view of one embodiment of a suitable first blade segment adjoined with a second blade segment, or a blade insert, utilizing with a connecting structure in accordance with aspects of the present subject matter.

In several embodiments, the body 28 of the rotor blade 22 may be formed as a single, unitary component. Alternatively, the body 28 may be formed from a plurality of shell components. For example, the body 28 may be manufactured from a first shell half generally defining the pressure side 30 of the rotor blade 22 and a second shell half generally defining the suction side 32 of the rotor blade 20, with the shell halves being secured to one another at the leading and trailing edges 34, 36 of the blade 22. Additionally, the body 28 may generally be formed from any suitable material. For instance, in one embodiment, the body 28 may be formed entirely from a laminate composite material, such as a carbon fiber reinforced laminate composite or a glass fiber reinforced laminate composite. Alternatively, one or more portions of the body 28 may be configured as a layered construction and may include a core material 42 (e.g., as shown in FIG. 4), formed from a lightweight material such as wood (e.g., balsa), foam (e.g., extruded polystyrene foam) or a combination of such materials, disposed between layers of laminate composite material.

Figure 5:
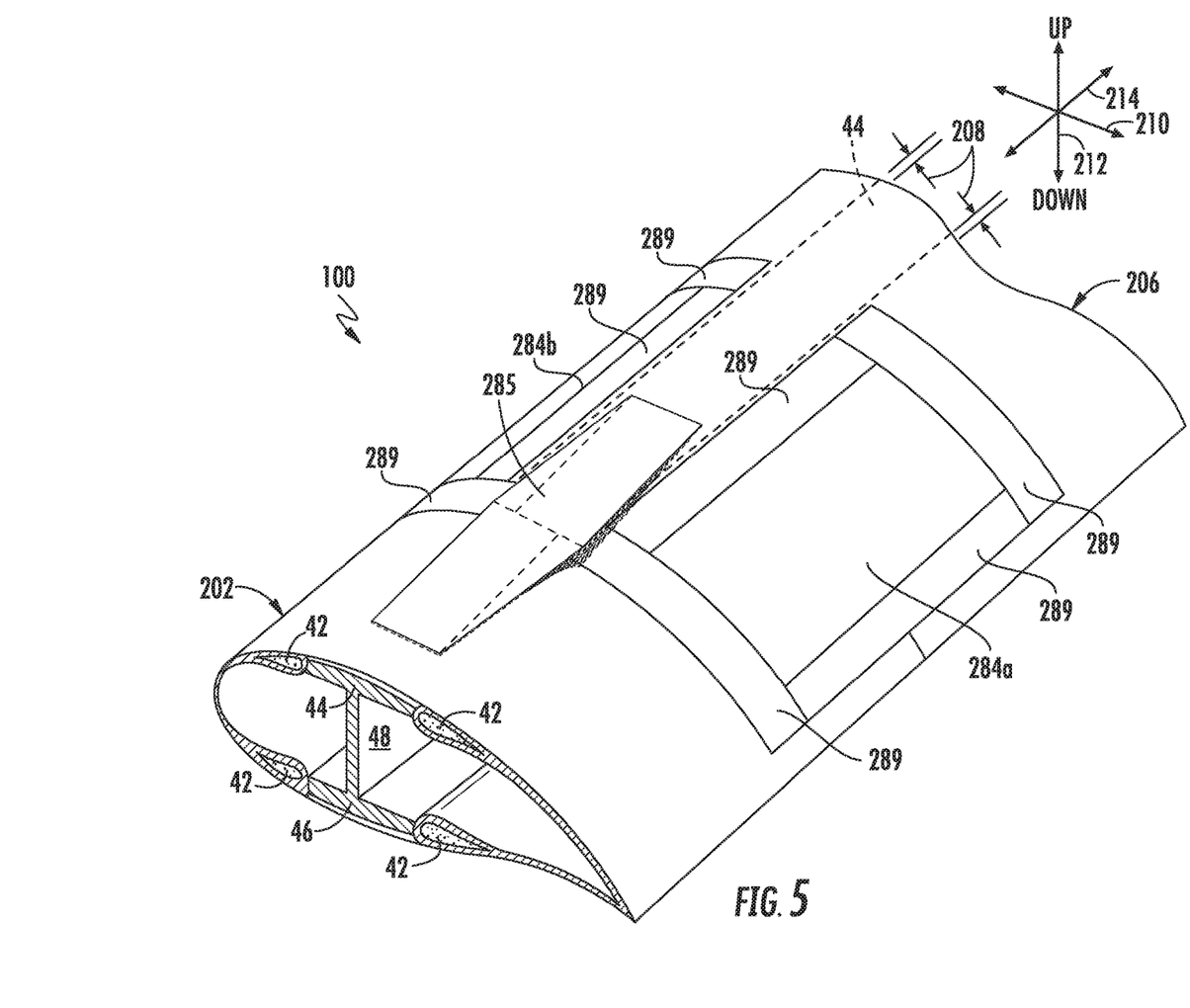
FIG. 5 illustrates a perspective view of the assembled blade assembly shown in FIG. 4.

It should be appreciated that the rotor blade 22 may also include one or more longitudinally extending structural components configured to provide increased stiffness, buckling resistance and/or strength to the rotor blade 22. For example, in several embodiments, the rotor blade 22 may include a pair of spar caps (e.g., a top spar cap 44 and a bottom spar cap 46) and one or more shear webs 48 extending between the opposed spar caps 44, 46 (e.g., as shown in FIGS. 4 and 5).

Figure 3:
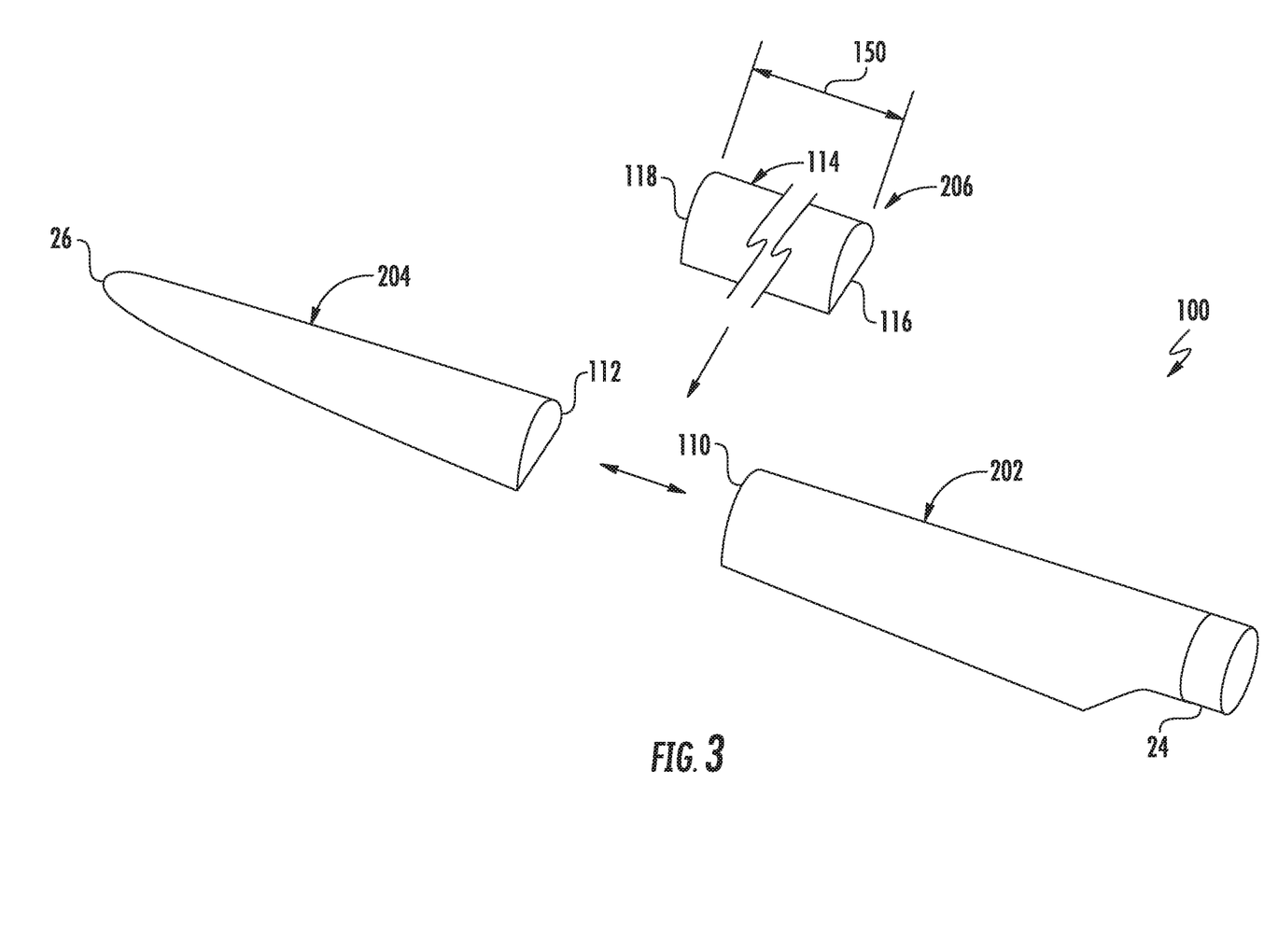
FIG. 3 illustrates an exploded view of one embodiment of a modular rotor blade assembly, or blade insert, in accordance with aspects of the present subject matter.

Referring now to FIG. 3, one embodiment of a rotor blade assembly 100 is illustrated in accordance with aspects of the present subject matter. As shown, the rotor blade assembly 100 may include a first blade segment 202, a third blade segment 204 and a second blade segment 206 configured to be coupled between the first and third blade segments 202, 204. In general, the rotor blade assembly 100 may be configured such that, when the first and third blade segments 202, 204 are coupled together via the second blade segment 206, a complete modular rotor blade is formed.

In some embodiments, the first and third blade segments 202, 204 may be formed by dividing a pre-existing rotor blade 22 into two separate blade sections and inserting the second blade segment 206 as a "blade insert". For example, as shown in FIGS. 2 and 3, in one embodiment, the illustrated rotor blade 22 may be divided into the first and third blade segments 202, 204 by cutting the rotor blade 22 along a joint or cut line 108 and inserting the second blade segment 206 as a blade insert. Thus, in the illustrated embodiment, the first blade segment 202 may correspond to a root segment of the rotor blade 22 and may extend between the blade root 24 and a first joint end 110 formed at the joint or cut line 108. Similarly, in the illustrated embodiment, the third blade segment 204 may correspond a tip segment of the rotor blade 22 and may extend between the blade tip 26 and a second joint end 112 formed at the joint or cut line 108. The second blade segment 206 can be configured as a blade insert with blade joints configured at the first and second joint ends 110, 112.

It should be appreciated that, although the first blade segment 202 is shown as a root segment and the third blade segment 204 is shown as a tip segment, the terms "first blade segment", "second blade segment" and "third blade segment" may generally refer to any suitable segments or sections of the rotor blade 22. For example, in another embodiment, the first blade segment 202 may correspond to a tip segment of the rotor blade 22 and the second blade segment 206 may correspond to a root segment of the rotor blade 22. In a further embodiment, the first and second blade segments 202, 204 may correspond to shorter segments of the rotor blade 22.

Additionally, it should be appreciated that, as used herein, the terms "first blade segment", "second blade segment" and "third blade segment" need not be limited to a single, continuous blade segment. For example, in the illustrated embodiment, the first blade segment 202 may be formed from a single, unitary blade segment extending between the blade root 24 and the first joint end 110 or the first blade segment 202 may be formed from two or more blade segments that, when coupled together, extend between blade root 24 and the first joint end 110. Similarly, in the illustrated embodiment, the second blade segment 204 may be formed from a single, unitary blade segment extending between the second joint end 112 and the blade tip 26 or the second blade segment 204 may be formed from two or more blade segments that, when coupled together, extend between the second joint end 112 and the blade tip 26.

Moreover, it should be appreciated that the joint or cut line 108 (FIG. 2) may generally be located at any suitable position along the span 38 of the rotor blade 22. For example, in one embodiment, the distance of the joint or cut line 108 from the blade root 24 may range from about 40% to about 95% of the span 38, such as from about 40% to about 80% of the span 28 or from about 50% to about 65% of the span 38. However, it is foreseeable that, in other embodiments, the distance of the joint or cut line 108 from the blade root 34 may be less than 40% of the span 38 or greater than 95% of the span 38.

It should also be appreciated that, in alternative embodiments, the first and second blade segments 202, 204 need not be formed by cutting or otherwise dividing a pre-existing rotor blade 22 into two separate blade sections. For example, in another embodiment, the first and third blade segments 202, 204 may be separately manufactured as modular blade segments and assembled together with the second blade segment 206 to form a modular rotor blade assembly 100.

Referring still to FIG. 3, the second blade segment 206 of the rotor blade assembly 100 may generally have an elongated, aerodynamic body 114 extending between a forward end 116 and an aft end 118, thereby forming a separate blade segment of the rotor blade assembly 100. In general, the second blade segment 206 may be configured to be coupled between the first and third blade segments 202, 204 in order to form the rotor blade assembly 100. Specifically, the forward end 116 of the second blade segment 206 may be configured to be coupled to the joint end 110 of the first blade segment 202 and the aft end 118 of the second blade segment 206 may be configured to be coupled to the joint end 112 of the third blade segment 204. Suitable configurations and methods for attaching the second blade segment 206 between the first and second blade segments 202, 204 having misaligned spar caps will generally be described below with reference to FIGS. 4-15.

Referring now to FIGS. 4-5, assembly views of the second blade segment 206 assembled with the first blade segment 202 are illustrated in accordance with aspects of the present subject matter. A directional legend shown on FIG. 4 establishes the chordwise direction 210, flapwise direction 212, and spanwise direction 214 for the rotor blade assemblies disclosed herein. Specifically, FIG. 4 illustrates a perspective view of the second blade segment 206 and the first blade segment 202 positioned end-to-end, with suitable components for securing the second blade segment 206 to the first blade segment 202 being exploded outward. FIG. 5 illustrates a perspective, assembled view of the various components shown in FIG. 4.

As shown in FIG. 4, when the first blade segment 202 and the second blade segment 206 are positioned end-to-end, separate access windows (e.g., a first access window 240 and a second access window 241) may be defined between such components along either side of the elongated portion 247 of the top side 220 of the second blade segment 206. Such access windows 240, 241 may generally allow a service worker(s) to access the interior of the rotor blade assembly 100, thereby facilitating the installation of many of the assembly components shown in FIG. 5. For example, a suitable bottom scarfed connector 281 may be positioned across the interface defined between the bottom scarfed sections 260, 276 of the second blade segment 206 and the first blade segment 202 while suitable bottom shell inserts 282 may be positioned at each interface defined between the bottom flanges 274, 280 of the second blade segment 206 and the first blade segment 202. The bottom scarfed connector 281 can include a connecting structure 285, described below, that compensates for misalignment and/or dissimilar width of the bottom spar caps 46. In addition, as shown in FIG. 4, a shear web insert 283 may be installed within the rotor blade assembly 100 so as to extend spanwise between the ends of the shear webs 48, for the first blade segment 202 and the second blade segment 206.

As shown in FIGS. 4-5, with more details in FIGS. 6-14, the bottom scarfed connector 281 and opposing top scarfed connector 290 can be at least one connecting structure 285 at least partially connecting the first blade segment 202 and the second blade segment 206 at respective spar caps 44, 46. In some embodiments, the connecting structure 285 is assembled as the entire top scarf connector 290 and bottom scarfed connector 281. The connecting structure 285 can at least partially connect a first blade segment 202 defining a first joint end 110, the first blade segment 202 having at least one spar cap 44, 46, with a second blade segment 206 defining a forward end 116 coupled to the first blade segment 202. The second blade segment 206 can have at least one spar cap offset 208 from the spar cap of the adjoining first blade segment 202.

Figure 6:
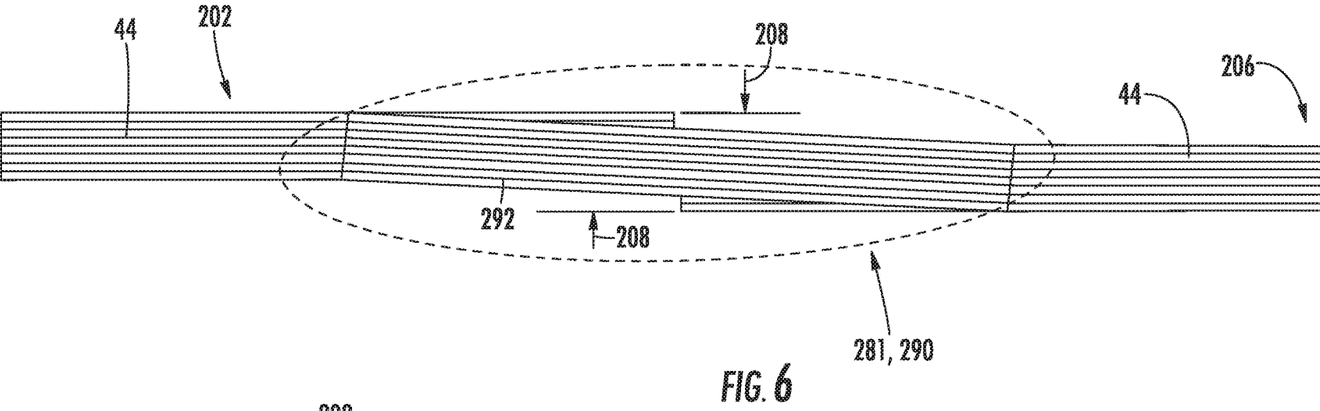
FIG. 6 illustrates a plan view of one embodiment of chordwise misaligned adjoining spar caps with misaligned fibers in the connecting structure in accordance with aspects of the present subject matter.

Referring to FIG. 6, an illustration of one embodiment having chordwise misaligned adjoining spar caps 44, misaligned offsets 208, that creates misaligned fibers 292 when the connecting structure 285, in the top and bottom scarfed connectors 281, 290, is positioned parallel with respective portions of the misaligned adjoining spar caps 44. Compressive and tensile forces applied to the misaligned fibers 292 at the spar cap joint will have a force component that is misaligned with the fibers in the adjoining spar caps thereby weakening the connectors 281, 290.

Figure 7:
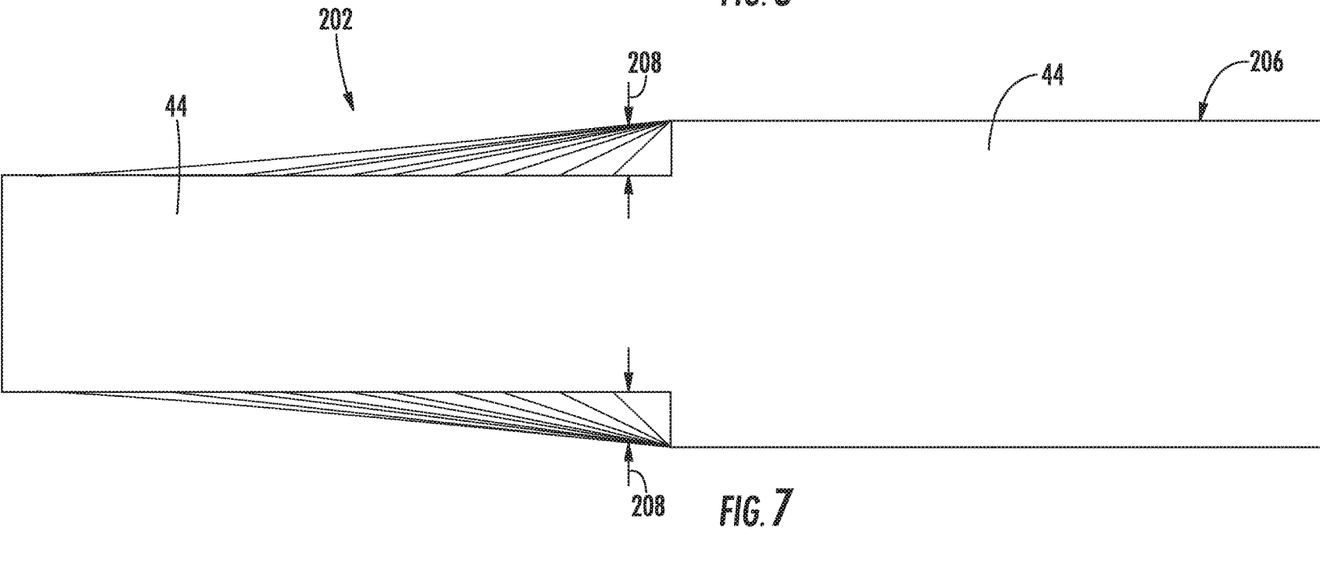
FIG. 7 illustrates a plan view of chordwise misalignment of dissimilar sized spar caps that may use the disclosed connecting structure in accordance with aspects of the present subject matter.

Referring to FIG. 7, an embodiment illustrating dissimilar width spar caps 44 is shown, creating offsets 208 adjacent only the smaller-width spar cap that are compensated by a connecting structure 285 having a similar geometry adjacent both chordwise edges of the smaller-width spar cap 44. More details of this configuration are shown in FIGS. 19-22.

FIGS. 8-11 illustrate how at least one connecting structure 285 can be coupled between the adjoining misaligned top and bottom spar caps 44, 46 of the first blade segment 202 and the second blade segment 206, using a plurality of sequentially stacked plies configured for parallel fiber alignment with the adjoining spar caps 44, 46 and cross-sectional area continuity with the adjoining spar caps 44, 46. The plurality of stacked plies can be a plurality of predefined geometric shapes with consecutively chamfered edges. The predefined geometric shapes can be at least one of polygons, irregular hexagons, and sequentially larger irregular hexagons. At least one contoured adjacent structure 286 can be formed in the blade assembly 100 such that the plurality of stacked plies in the connecting structure 285 conforms against the at least one contoured adjacent structure 286. The connecting structure 285 serves to structurally connect spar caps 44, 46 having at least one spar cap offset 208 in a chordwise direction while maintaining parallel fiber direction with the adjoining spar caps and cross-sectional area at the adjoining spar cap interface.

The connecting structure 285 can further connect a third blade segment 204 defining a second joint end 112, the second joint 112 end opposing the first joint end 110, wherein the second blade segment 206 extends to an aft end 118 coupled to the third blade segment 204, the second joint end 112 having at least one second joint end connecting structure 285.

The connecting structure 285 can have a plurality of stacked plies arranged within and aligning the top and bottom spar caps 44, 46 of the first blade segment 202 with the top and bottom spar caps 44, 46 of the second blade segment 206. Each ply of the plurality of stacked plies can have a predefined geometric shape, for example polygons or irregular hexagons, configured to maintain the cross-sectional area of the connecting structure(s) 285 greater than or equal to the smallest cross-sectional area of the adjoining spar caps 44, 46. The connecting structure(s) 285 can be disposed in at least one of a top and bottom scarfed section 281, 290.

As shown in FIGS. 9-14, at least one contoured adjacent structure 286 can be used to assemble the connecting structure 285 by stacking the plurality of stacked plies in a specific order such that the plies conform against the at least one contoured adjacent structure 286. The at least one contoured adjacent structure 286 can be a sloped edge 287 cut into adjacent structure, such as foam. The sloped edge 287 can be disposed adjacent to the first joint end 110 of the first blade segment and adjacent to the second blade segment forward end 116.

In some embodiments, the top spar cap 44 of the second blade segment 206 can be offset 208 from the top spar cap 44 of the first blade segment 202 in a chordwise direction 210. Also, the bottom spar cap 46 of the second blade segment 206 cam be offset 208 from the bottom spar cap 46 of the first blade segment 202 in a chordwise direction 210. The connecting structure 285 provides a connection that is structurally equivalent to the misaligned spar caps 44, 46 by creating a fiber direction in each ply of the plurality of stacked plies of the at least one connecting structure 285 that is parallel with a fiber direction in adjacent portions of the rotor blade assembly, for example the top and bottom spar caps 44, 46. In addition, the cross-sectional area of the connecting structure 285 is greater than or equal to a cross-sectional area of adjacent portions of the rotor blade assembly, for example the smallest cross-sectional area of the interface at the top and bottom spar caps 44, 46. The connecting structure 285 can essentially be a pictured as an irregular hexagon-shaped connector having laminate plies stacked in a specific sequence such that the fiber direction in the plies is parallel with the fiber direction of the adjoining spar caps 44, 46, and the cross-sectional area is maintained greater than or equal to the spar caps 44, 46 across the length of the connecting structure 285. Constructing the connecting structure 285 in this manner maintains the structural properties of the connecting structure 285 equivalent to the structural properties of the misaligned spar caps 44, 46. Conventional methods of constructing the connecting structure would simply stack plies at an angle set by the misalignment of the adjoining spar caps, thereby causing the fiber direction misalignment 292 as seen in FIG. 6 and sacrificing the structural properties of the connecting structure disclosed herein.

Moreover, as shown in the illustrated embodiment, the rotor blade assembly 100 may also include a top scarfed connector 290 configured to be positioned across the aligned top scarfed sections 252, 275 of the second blade segment 206 and the first blade segment 202. As shown in FIG. 4, the top scarfed connector 290 may define a tapered profile corresponding to the tapered profiles defined by the top scarfed sections 252, 275. Thus, as particularly shown in FIG. 5, the top scarfed connector 290 may be configured to extend across the interface defined between the first blade segment 202 and the second blade segment 206 so as to fill the area defined by the top scarfed sections 252, 275. At least one connecting structure 285 can be disposed in the top scarfed connector 290 to compensate for misalignment of the adjacent spar caps 44.

It should be appreciated that the bottom scarfed connector 281, the bottom shell inserts 282, the top scarfed connector 290 and the tip shell inserts 289 may be pre-fabricated components or may be formed or otherwise built up during assembly of the rotor blade assembly 100. Additionally, it should be appreciated that, after the various components of the rotor blade assembly 100 have been assembled between the first blade segment 202 and the second blade segment 206, an overlaminate may be applied around the outer surface of the rotor blade assembly 100 to ensure a smooth aerodynamic transition between the first blade segment 202 and the second blade segment 206.

Moreover, it should be appreciated that, although the second blade segment 206 was described with reference to FIGS. 4-6 as simply being secured to one of the blade segments (e.g., the first blade segment 202), the same or a similar methodology, as well as the same or similar components, may be used to secure the second blade segment 206 to the other blade segment (e.g., the third blade segment 204). For example, a bottom scarfed connector 281, bottom shell inserts 282, a shear web insert 283, a window cover(s) 284*a*, 284*b*, top shell inserts 289 and a top scarfed connector 290 may be installed between the aft end 218 of the second blade segment 206 and the joint end 112 of the third blade segment 204 to allow such components to be secured to another in the same manner that the second blade segment 206 and the first blade segment 202 were secured together (e.g., as shown in FIGS. 4-6).

Further, it should be appreciated that each second blade segment 206 described herein may be considered as a blade insert. Thus, one of ordinary skill in the art should appreciate that the disclosed rotor blade assembly 100 may include one or a plurality of blade inserts 206 with each blade insert forming an individual segment of the rotor blade assembly 100.

Figure 8:
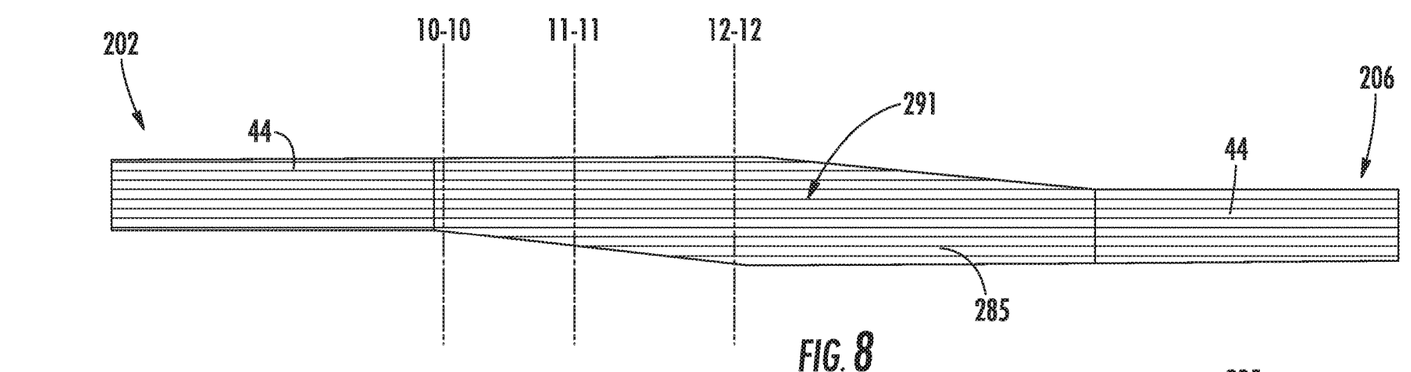
FIG. 8 illustrates a plan view of aligned fibers in a connecting structure embodiment between misaligned spar caps in accordance with aspects of the present subject matter.
Figure 9:
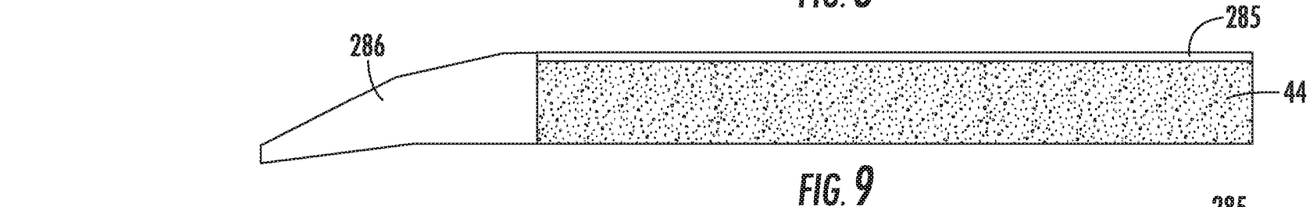
FIGS. 9-11 illustrate sectional views of a connecting structure embodiment used in the rotor blade assembly as shown in FIG. 8.
Figures 10, 11:
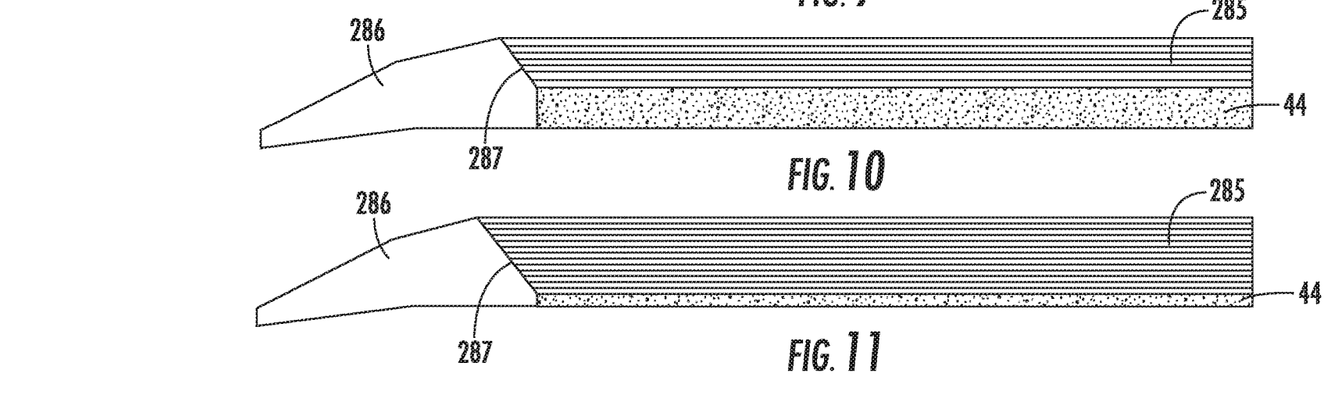
Figure 12:
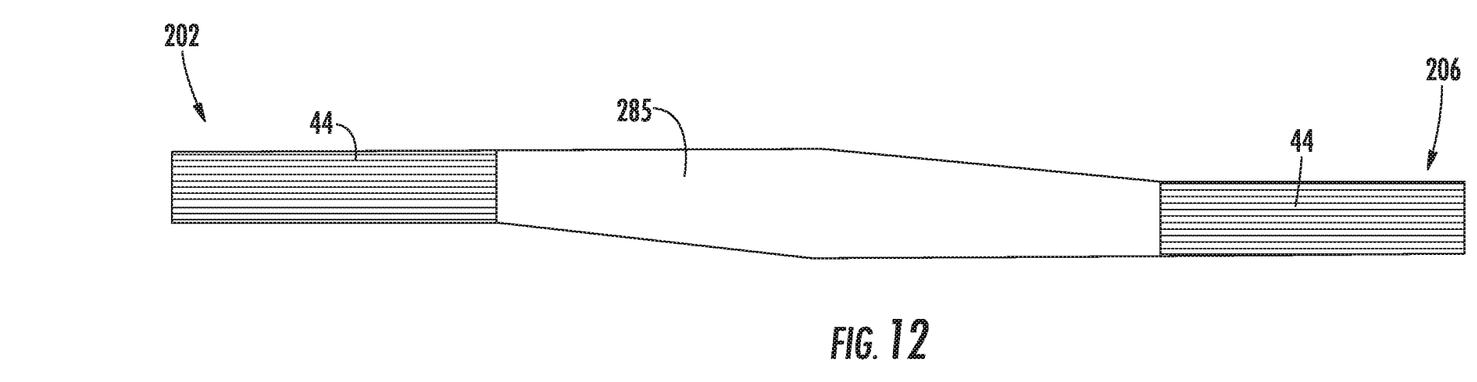
FIGS. 12-13 illustrate a plan and sectional view of a connecting structure embodiment using pultruded rods placed on a non-woven fabric.
Figure 13:
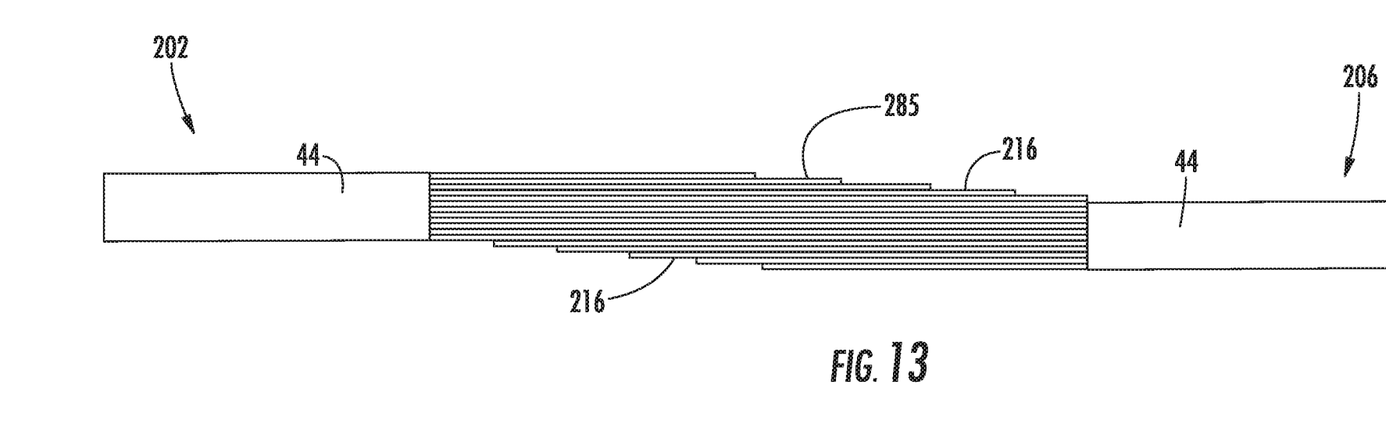
Figure 14A:
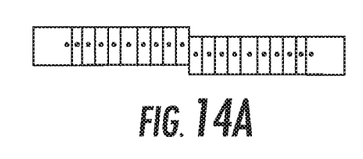
FIGS. 14A-14J illustrate an embodiment of the connecting structure built in a sequence of ten steps, each step being one of nine stacked plies.
Figure 14B:
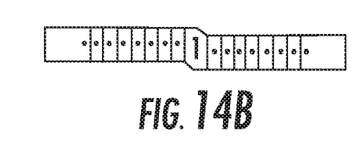
Figure 14C:
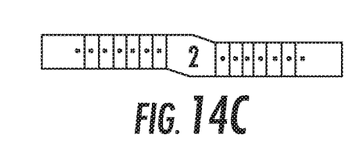
Figure 14D:
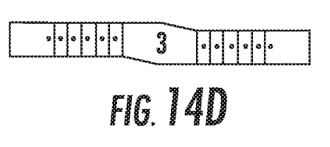
Figure 14E:
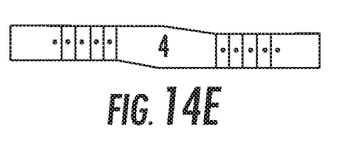
Figure 14F:
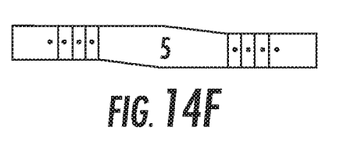
Figure 14G:
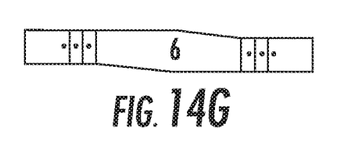
Figure 14H:
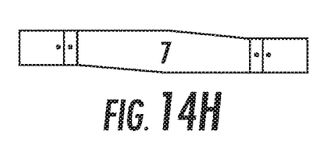
Figure 14I:
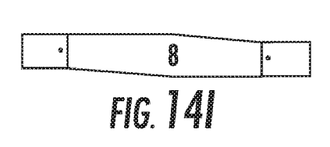
Figure 14J:
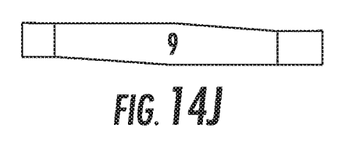

Moving to FIGS. 6-22, more details of the connecting structure 285 are provided showing a structurally equivalent device to the adjoining spar caps 44, 46 and a method for compensating for the chordwise spar cap offset 208. FIG. 8 shows the irregular-hexagon-shaped connecting structure 285, typically made from a fabric laminate, positioned in the top or bottom scarfed connectors 281, 290 with the contoured adjacent structure 286 adjacent the connecting structure 285. Fiber alignment 291 in the connecting structure 285 is shown to demonstrate parallel configuration with adjoining spar caps 44. The contoured adjacent structure 286 can be formed from a lightweight material such as wood (e.g., balsa), foam (e.g., extruded polystyrene foam) or a combination of such materials. FIGS. 9-11 show section cuts through the connecting structure 285 and contoured adjacent structure 286 at various locations, where it is seen that the cross-sectional area of the connecting structure 285 is greater than or equal to the adjoining spar cap cross-sectional area at each section cut. FIGS. 12-13 show an embodiment using cured pultruded rods placed on a non-woven fabric 216, or similar material to construct the connecting structure 285. Individual rods 216 can be cut back, at approximately a 90 degree cut, to match the desired shape of the connecting structure 285, such as polygons or irregular hexagons.

FIG. 14 shows an embodiment of the connecting structure 285 built in a sequence of ten steps, steps two through ten being sequentially stacked plies of the connecting structure 285. Each ply has a predetermined geometric shape and is oriented such that the fiber direction in the ply is parallel with the fiber direction in the adjacent spar cap. The plies are stacked individually in a specific sequence to build-up the connecting structure 285 in a form that maintains cross-sectional area greater than or equal to the adjoining misaligned spar caps. The connecting structure 285 can be packaged in a kit so that the ply sequence is maintained during installation.

Figures 15, 16:
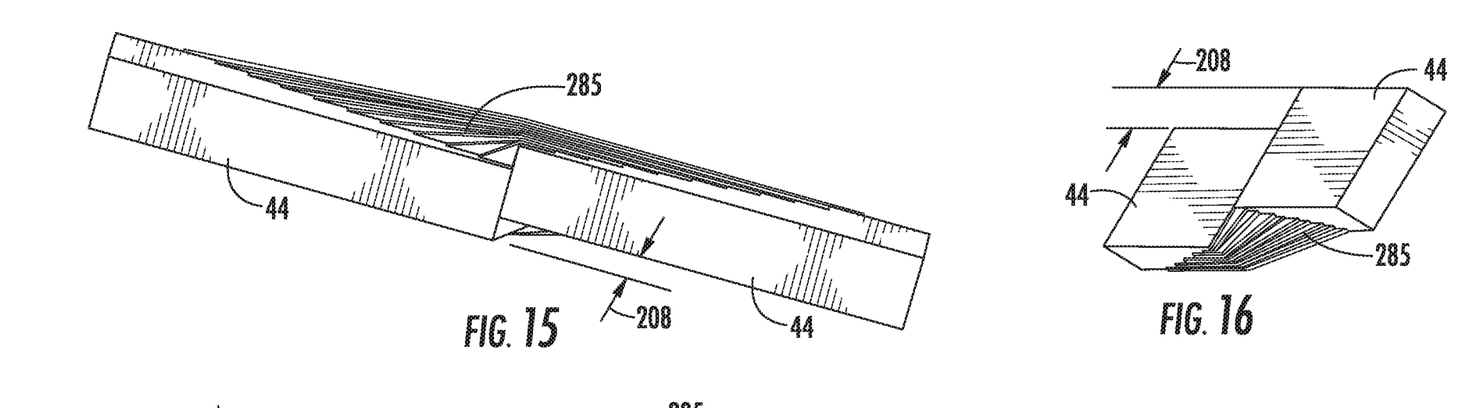
FIGS. 15-18 illustrate various views of an embodiment of the connecting structure used to join spar caps of similar width but chordwise misaligned.
Figures 17, 18:
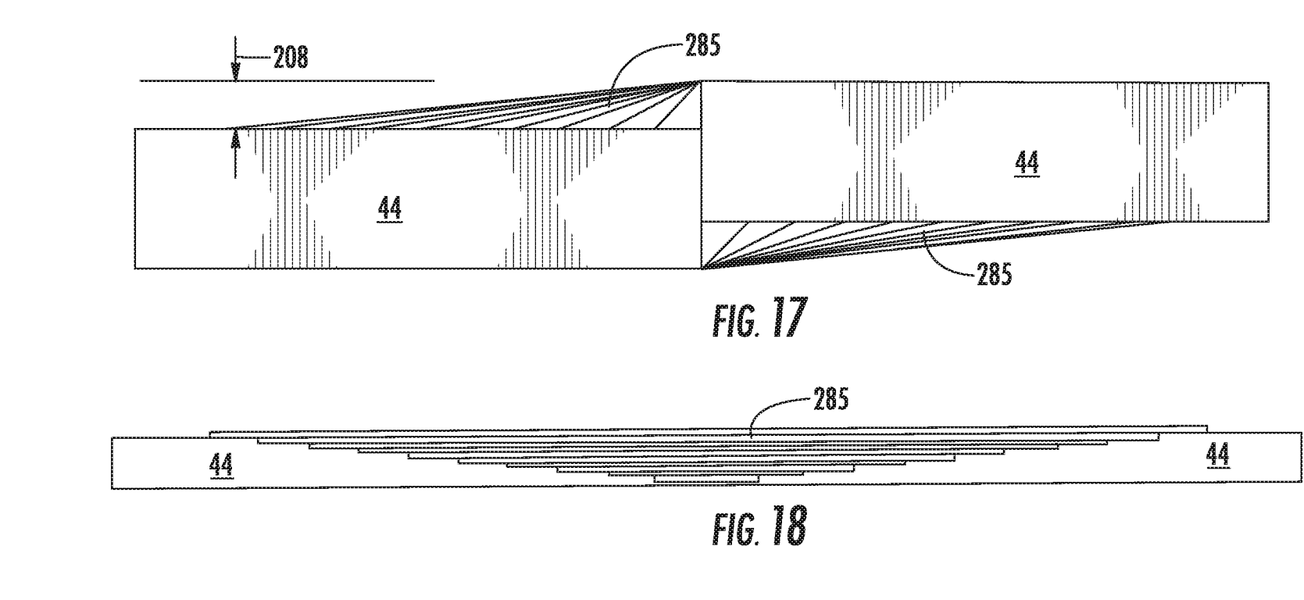

FIGS. 15-18 illustrate various views of an embodiment of the connecting structure used to join spar caps of similar width but are chordwise misaligned by the offset 208. Portions of the adjoining spar caps 44 are shown, from adjoining blade segments 202 and 206, that form the top and bottom scarfed sections 252, 260 with the connecting structure 285 'nested' in the respective scarfed sections 252, 260. FIGS. 15 and 16 are perspective views from the 'bottom' of the connecting structure 285, or from inside of the adjoined blade segments 202, 206, with the spar cap offset 208 aligned with the blade segment joint at the bottom of the V-shaped scarfed section 252, 260. The plies in each spar cap 44 on each blade segment 202, 206 are cut back at an angle to form the V-shaped top and bottom scarfed sections 252, 260 for the stacked plies of the connecting structure 285 to lay in. FIG. 17 is a bottom view of the connecting structure 285 and FIG. 18 is a side view of the connecting structure 285.

Figure 19:
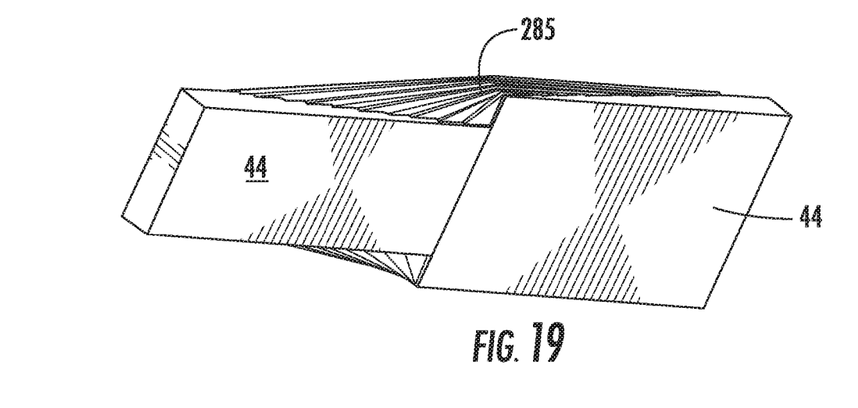
FIGS. 19-22 illustrate various views of an embodiment of the connecting structure used to join spar caps of dissimilar width but chordwise aligned at their spanwise centerlines.
Figure 20:
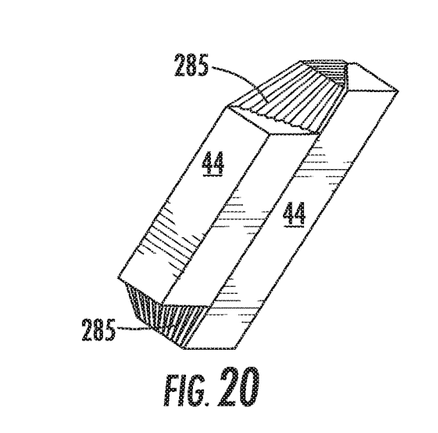
Figure 21:
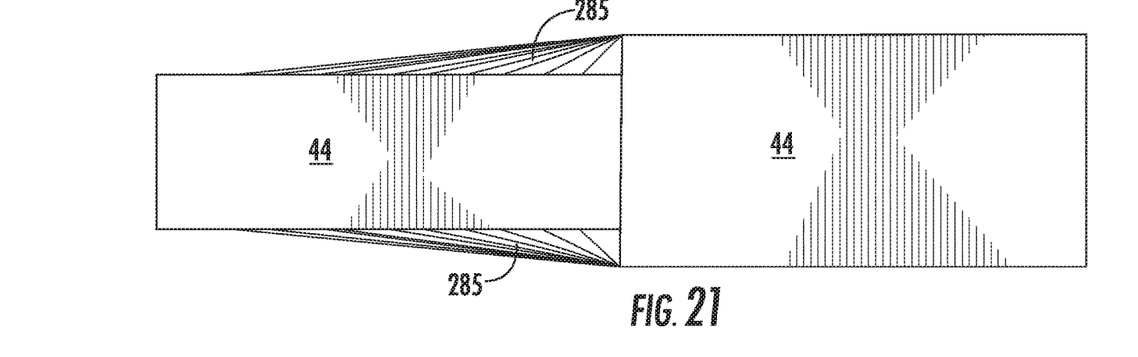
Figure 22:
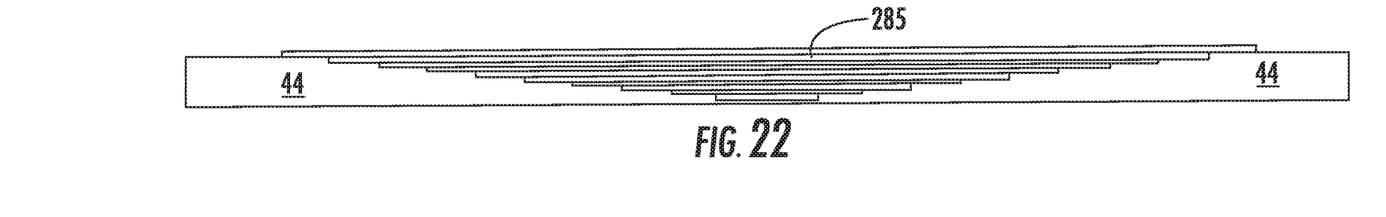

FIGS. 19-22 illustrate various views of an embodiment of the connecting structure used to join spar caps of dissimilar width but chordwise aligned at their spanwise centerlines, as also seen in FIG. 7. Portions of the adjoining spar caps 44 are shown, from adjoining blade segments 202 and 206, that form the top and bottom scarfed sections 252, 260, with the connecting structure 285 'nested' in the respective scarfed sections 252, 260. FIGS. 19 and 20 are perspective views from the 'bottom' of the connecting structure 285, or from inside of the adjoined blade segments 202, 206, with the spar cap offsets 208 aligned with the blade segment joint at the bottom of the V-shaped scarfed section 252, 260 and positioned on each chordwise side of the smaller-width spar cap 44. The plies in each spar cap 44 on each blade segment 202, 206 are cut back at an angle to form the V-shaped top and bottom scarfed sections 252, 260 for the stacked plies of the connecting structure 285 to lay in. FIG. 21 is a bottom view of the dissimilar width connecting structure 285 and FIG. 22 is a side view of the dissimilar width connecting structure 285.

A method for assembling a rotor blade assembly is disclosed as having a first blade segment 202 and a second blade segment 206, the method including the steps of positioning a forward end 116 of the second blade segment 206 adjacent to a first joint end 110 of the first blade segment 202. The top side 220 of the second blade segment 206 has a top spar cap offset 208 from a top spar cap 44 of the first blade segment 202 at a top offset location and the bottom side 222 of the second blade segment 206 has a bottom spar cap offset 208 from the bottom spar cap 46 of the first blade segment 202 at a bottom offset location. Then, at least one contoured adjacent structure 286 is constructed and positioned such that the at least one contoured adjacent structure 286 is adjacent at least one of the top offset location or the bottom offset location. A plurality of plies is then stacked to construct at least one of a top and bottom connecting structure 285 that conforms against the at least one contoured adjacent structure 286. Each ply of the connecting structure 285 can be sequentially stacked in a predetermined order such that a cross-sectional area of the at least one of the top and bottom connecting structures 285 is greater than or equal to the adjoining misaligned spar caps 44, 46. A sloped edge 287 can be positioned on opposing sides of the least one contoured adjacent structure 286.

A method can also position the forward end 116 of the second blade segment 206 adjacent a third blade segment 204 defining a second joint end 112, the second joint end 112 opposing the first joint end 110, the second blade segment 206 extending to an aft end 118 coupled to the third blade segment 204, the second joint end 112 having at least one second connecting structure 285.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a first blade segment defining a first joint end, the first blade segment comprising at least one spar cap;
    a second blade segment defining a forward end coupled to the first blade segment, the second blade segment comprising at least one spar cap offset from the spar cap of the adjoining first blade segment; and,
    at least one connecting structure coupled between the adjoining spar caps of the first blade segment and the second blade segment, the connecting structure comprising a plurality of sequentially stacked plies that maintain cross-sectional area continuity with adjoining spar caps,
    wherein each of the plurality of stacked plies defines a geometric cross-sectional shape on a plane along a longitudinal axis of the rotor blade assembly, the plurality of stacked plies comprising consecutively chamfered edges, the geometric cross-sectional shapes comprising irregular hexagons.

2. The rotor blade assembly of claim 1, wherein the plurality of sequentially stacked plies maintains parallel fiber alignment with adjoining spar caps.

3. The rotor blade assembly of claim 1, wherein the second blade segment comprises a blade insert.

4. The rotor blade assembly of claim 1, wherein the predefined geometric shapes comprises stacked plies of sequentially larger irregular hexagons.

5. The rotor blade assembly of claim 1, wherein the at least one connecting structure is disposed in at least one of a top and bottom scarfed section.

6. The rotor blade assembly of claim 1, further comprising at least one contoured adjacent structure, wherein the plurality of stacked plies in the connecting structure is configured to conform against the at least one contoured adjacent structure.

7. The rotor blade assembly of claim 1, further comprising a third blade segment defining a second joint end, the second joint end opposing the first joint end, and wherein the second blade segment extends to an aft end coupled to the third blade segment, the second joint end comprising at least one second joint end connecting structure.

8. The rotor blade assembly of claim 1, wherein the at least one spar cap offset is in a chordwise direction.

9. The rotor blade assembly of claim 1, wherein the cross-sectional area of the at least one connecting structure remains greater than or equal to the smallest cross-sectional area at the adjoining spar cap interface.

10. A connecting structure in a rotor blade assembly for a wind turbine, the connecting structure comprising:
    a plurality of sequentially stacked plies configured for parallel fiber alignment with the adjoining spar caps of first and second blade segments of the rotor blade assembly, the adjoining spar caps having at least one large-width spar car of the first blade segment and at least one small-width spar cap of the second blade segment offset on both chordwise edges from the large-width spar cap of the adjoining first blade segment; and
    a cross-sectional area continuity with the adjoining spar caps of first and second blade segments of the rotor blade assembly,
    wherein each of the plurality of stacked plies defines a geometric cross-sectional shape on a plane along a longitudinal axis of the rotor blade assembly, the plurality of stacked plies comprising consecutively chamfered edges, the geometric cross-sectional shapes comprising irregular hexagons.

* * * * *